United States Patent [19]

Judge

[11] Patent Number: 5,092,636
[45] Date of Patent: Mar. 3, 1992

[54] SEALING RING DISPOSED IN RECESSED FLANGE MEMBER

[75] Inventor: James P. Judge, 2341 Glenmoor Rd. N., Clearwater, Fla. 34625

[73] Assignee: James P. Judge

[21] Appl. No.: 592,607

[22] Filed: Oct. 4, 1990

[51] Int. Cl.$^5$ ............................................. F16L 23/00
[52] U.S. Cl. .................................... 285/349; 285/368; 285/347; 285/379; 277/105; 277/152
[58] Field of Search ............... 277/105, 106, 152, 142, 277/143; 285/349, 350, 368, 347, 379, 910, 918

[56] References Cited

U.S. PATENT DOCUMENTS

| | | | |
|---|---|---|---|
| D. 31,415 | 8/1899 | Norris . | |
| D. 32,696 | 5/1900 | Merwarth . | |
| D. 244,533 | 5/1977 | Eidelberg et al. | D23/47 |
| 1,264,012 | 4/1918 | Chatain . | |
| 1,790,957 | 2/1931 | Sykes . | |
| 1,862,153 | 9/1929 | Lee | 285/368 X |
| 1,976,589 | 10/1934 | Trickey | 285/101 |
| 2,225,508 | 12/1940 | Sadow et al. | 300/28 |
| 2,356,947 | 4/1941 | Pranger et al. | 277/105 |
| 2,793,057 | 5/1957 | McGugin | 285/349 X |
| 3,053,542 | 9/1962 | Haas | 277/142 |
| 3,191,949 | 6/1965 | Lansky et al. | 277/168 |
| 3,567,258 | 3/1969 | Scaramucci | 285/349 X |
| 3,746,348 | 7/1973 | Stone | 277/11 |
| 3,990,711 | 11/1976 | Hill | 277/168 |

Primary Examiner—Randolph A. Reese
Assistant Examiner—Tim Aberle
Attorney, Agent, or Firm—Pettis & McDonald

[57] ABSTRACT

A sealing ring having a predetermined axis of symmetry is formed of a resiliently compressible elastomer for use in a sealing ring system in which two members are secured together with the ring interposed therebetween. The sealing ring has an annular base portion that has substantially parallel first and second axially extending surfaces with each surface having a first axial edge and a second axial edge spaced therefrom, and the second axial edges are joined by a radially extending surface. Integrally formed with the base portion is an annular head portion that extends between both of the first axial edges of the axially extending surfaces of the base portion. The head portion has a predetermined maximum axial thickness and at least one substantially planar surface extending generally radially a predetermined distance from the first axial edge of at least one of the axially extending surfaces of the base, whereby each of the planar surfaces and the adjacent axially extending surfaces form a shoulder.

10 Claims, 1 Drawing Sheet

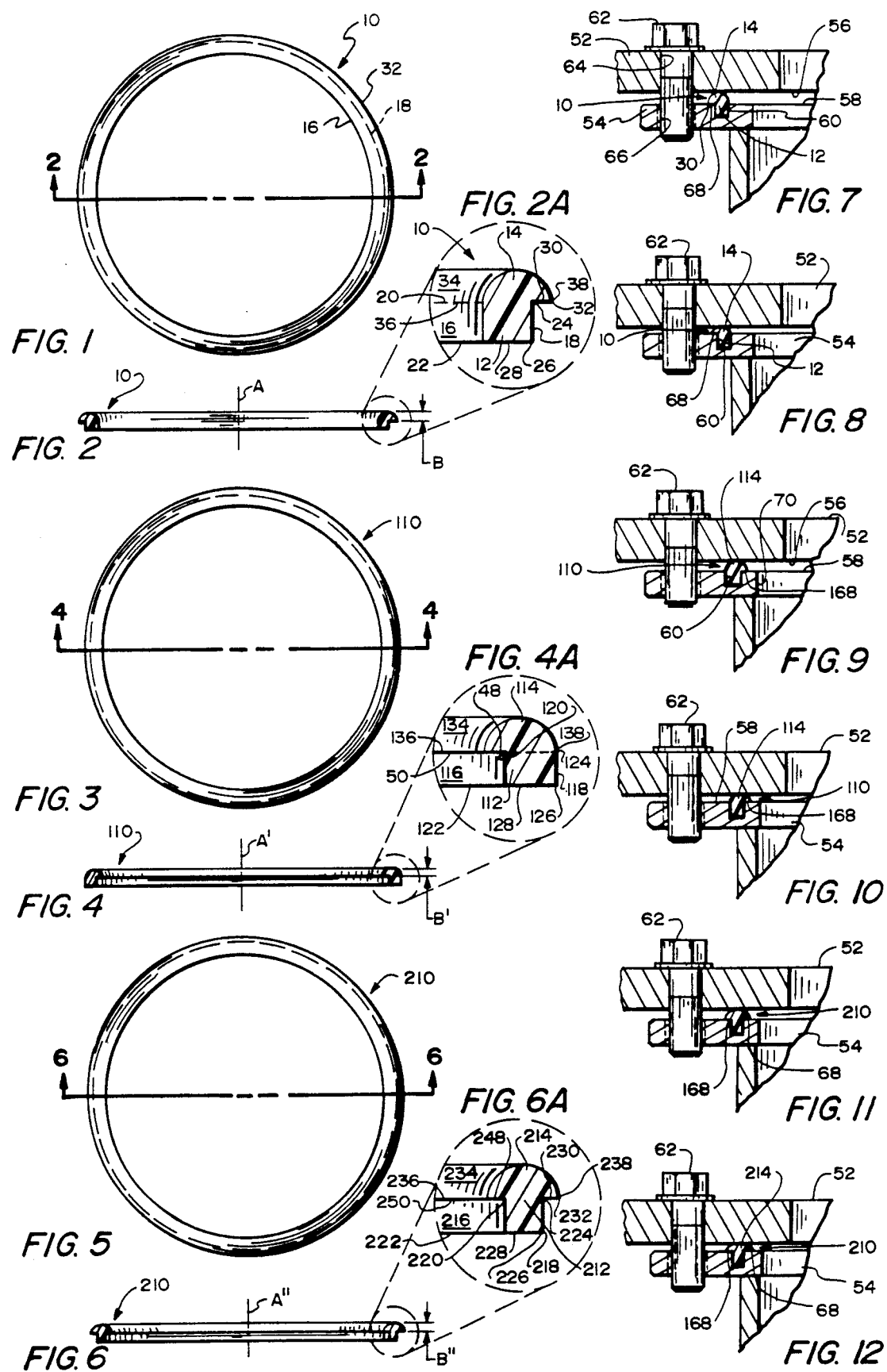

SEALING RING DISPOSED IN RECESSED FLANGE MEMBER

BACKGROUND OF THE INVENTION

This invention relates to sealing rings of resiliently compressible elastomers for use in sealing two members secured together with the ring interposed therebetween. More particularly, the sealing rings are used in equipment that generates high positive pressure, for example, compressors, or high negative pressure, for example, vacuum pumps.

In the prior art it has been customary to provide an annular ring of circular cross section, which is inserted into an annular recess in one member with a second member then brought into contact with the O-ring, such that the O-ring provides an annular seal between the two members. This O-ring projects above the recess; however, the portion retained within the recess does not fill this recess, because the circular cross section of the ring does not match the cross section of the recess, which is normally rectangular. The prior art has disclosed cross sectional configurations of O-rings of many varied shapes, having cross sections which do not fill their respective annular grooves. When an O-ring does not fill the recess, high positive pressure or high negative pressure will force the O-ring into the recess, causing it to collapse and permitting gaps to exist between the members to be sealed. These gaps, even when small, cause loss of efficiency due to loss of pressure or vacuum. When equipment is old and the members may be fatigued, warps in the members' surfaces and other distortions may occur, which creates variable spacing between the two members and results in gaps. These gaps result from the O-rings being compressed into the recess as the facing members are tightened in an attempt to gain a better seal between the warped members. In such cases it is even more critical that the sealing ring remains stable, has additional material extending above the recess and resists crushing into the recess.

SUMMARY OF THE INVENTION

The present invention provides a sealing ring of a resiliently compressible elastomer for use in a sealing ring system in which two members are secured together with the ring interposed therebetween. The sealing ring has an annular base portion with substantially parallel first and second axially extending surfaces. Each surface has a first axial edge and a second axial edge spaced therefrom, and the second axial edges are joined by a radially extending surface. An annular head portion is formed integrally with the base portion between both of the first axial edges of the axially extending surfaces of the base portion. This head portion is of a predetermined axial thickness. The head portion has at least one generally planar surface extending generally radially a predetermined distance from the first axial end of at least one of the axially extending surfaces of the base. The planar surface and the adjacent axially extending surface forms a shoulder.

When the sealing ring of this invention is used to provide a seal between two members that are secured together, the annular base portion of the sealing ring is inserted in an annular recess formed in one of the mutually opposing faces of one of the two members to be sealed.

BRIEF DESCRIPTION OF THE DRAWINGS

Particularly preferred embodiments of the apparatus of this invention will be described in detail below in connection with the drawings in which:

FIG. 1 is a top plan view of one embodiment of the apparatus of this invention;

FIG. 2 is a sectional elevation, taken along line 2—2 of FIG. 1;

FIG. 2A is an enlarged fragmentary view of the encircled portion of FIG. 2;

FIG. 3 is a top plan view of one embodiment of the apparatus of this invention;

FIG. 4 is a sectional elevation, taken along line 4—4 of FIG. 3;

FIG. 4A is an enlarged fragmentary view of the encircled portion of FIG. 4;

FIG. 5 is a top plan view of one embodiment of the apparatus of this invention;

FIG. 6 is a sectional elevation, taken along line 6—6 of FIG. 5;

FIG. 6A is an enlarged fragmentary view of the encircled portion of FIG. 6;

FIG. 7 is a fragmentary sectional elevation illustrating the embodiment of FIG. 1 installed in a noncompressed state between two members;

FIG. 8 is a fragmentary sectional elevation illustrating the embodiment of FIG. 1 installed in a compressed state between two members;

FIG. 9 is a fragmentary sectional elevation illustrating the embodiment of FIG. 3 installed in a noncompressed state between two members;

FIG. 10 is a fragmentary sectional elevation illustrating the embodiment of FIG. 3 installed in a compressed state between two members;

FIG. 11 is a fragmentary sectional elevation illustrating the embodiment of FIG. 5 installed in a noncompressed state between two members;

FIG. 12 is a fragmentary sectional elevation illustrating the embodiment of FIG. 5 installed in a compressed state between two members;

DETAILED DESCRIPTION

One preferred embodiment of the sealing ring of this invention is illustrated in FIGS. 1, 2, and 2A. FIG. 1 is a top plan view of the sealing ring shown generally as 10. FIG. 2 is a cross section taken along line 2—2 of the sealing ring shown in FIG. 1, disclosing the cross section of the sealing ring, which is more clearly shown in the enlarged fragmentary view of FIG. 2A. The sealing ring 10 has an axis of symmetry "A" which can best be seen in FIG. 2. The sealing ring, which may be formed of any suitable one of the well-known resiliently compressible elastomers, is comprised of an annular base portion 12 and an annular head portion 14.

The annular base portion 12 is symmetrically formed about the axis "A", such that the base portion 12 can be described as being formed of two substantially parallel surfaces, a first axially extending surface 16 and a second axially extending surface 18. The first axial surface 16 has a first axial edge 20 and a second axial edge 22 and the second axial surface 18 has a first axial edge 24 and a second axial edge 26. The first axial edge 20 of the first axial surface 16 may be defined as the locus of points where the surface 16 that extends generally parallel or concentric to the axis A meets the radially arcuate surface 34. The second edge 22 of the first axial surface 16 is joined to the second edge 26 of the second axial surface 18 by a radially extending surface 28.

The annular head portion 14 is formed integrally with the base portion 12, being joined between the first axial edges 20 and 24 of their respective axial surfaces 16 and 18 of the base portion 12. The head portion 14 has a generally planar surface 30 extending radially outwardly a predetermined distance from the first axial edge 24 of the second axial surface 18, defining a radially outward edge 32. The head portion 14 has a maximum axial thickness "B"; which thickness is determined by the curvature of the arcuate surface 34. In this embodiment the arcuate surface 34 comprises a surface of rotation having a semicircular cross section. In this preferred embodiment the radius of the semicircular cross section is approximately 0.19 inches; however, any appropriate radius that is suitable for the planned use of the sealing ring would be satisfactory, as may arcuate cross sections other than circular. For example, a longer radius is preferable when higher positive pressures or higher negative pressures are being produced. Also, a longer radius will generally provide a more efficient seal when the equipment to be sealed is old and the members being sealed do not fit flush with one another. The arcuate surface 34 has a radially inward edge 36 and a radially outward edge 38. The inward edge 36 of the arcuate surface 34 is joined to the first edge 20 of the first axial surface 16, while the outward edge 38 of the arcuate surface 34 is joined to the outward axial edge 32 of the outward planar surface 30 of the head portion 14.

In this embodiment, the preferred axial dimension of the first and second axially extending surfaces 16 and 18 is approximately 0.18 inches and the inner diameter of the base portion 12 of the sealing ring 10 is approximately 7.5 inches. These dimensions are suitable for the preferred embodiment and provide general proportional relationships; however, these dimensions may be significantly changed for different uses of the sealing ring and for uses with equipment having larger or smaller sized parts. The axial dimension of the annular base portion 12 is sized to fit snugly, without leaving gaps, into a generally rectangular recess 60 as shown in FIG. 7. As can also be seen in FIG. 7, the outward planar surface 30 forms a shoulder 68, which engages the facing surface 58 of the member 54 having the recess 60.

A second embodiment of the sealing ring 10 is illustrated in FIGS. 3, 4 and 4A. The sealing ring 110 has an axis of symmetry A'. The dimensions for this embodiment are generally the same as the preceding described embodiment 10, and the structure of the base portion 112 is constructed in the same manner as that of the first embodiment 10. That is, base portion 112 is constructed of two substantially parallel surfaces, a first axially extending surface 116 and a second axially extending surface 118. The first axial extending surface 116 has a first axial edge 120 and a second axial edge 122 and the second axial extending surface 118 has a first axial edge 124 and a second axial edge 126. The second axial edges 122 and 126 are joined by a radially extending surface 128.

The annular head portion 114 is formed integrally with the base portion 112, being joined between the first axial edges 120 and 124 of their respective axial surfaces 116 and 118 of the base portion 112. The head portion 114 has a planar surface 48 extending radially inwardly a predetermined distance from the first axial edge 120 of the first axial surface 116, defining a radially inward edge 50. The head portion 112 has a maximum axial thickness B'; which thickness is determined by the curvature of the arcuate surface 134, generally as described with respect to the embodiment of FIGS. 1 and 2. The arcuate surface 134 has a radially inner edge 136 and a radially outer edge 138. The inner edge 136 of the arcuate surface 134 is joined to the inward axial edge 50 of the inward planar surface 48 of the head portion 114, while the outer edge 138 of the arcuate surface 134 is joined to the first edge 124 of the second axial surface 118 of the base portion 112. In FIG. 4A, the dashed line signifies the locus of points where the surface 118 that extends generally parallel to axis A' meets the radially arcuate surface 134, and it is at this line that the edges, 124 and 138 respectively, of both surfaces meet. In this embodiment of the sealing ring 110, the same general dimensions may apply as described in reference to sealing ring 10. The dimensions are modified to accommodate the various sizes of equipment in which the sealing ring 110 can be used, and to accommodate the various pressures generated by the equipment in which the sealing ring is installed.

A third embodiment of the sealing ring is illustrated in FIGS. 5, 6 and 6A as sealing ring 210. Sealing ring 210 has an axis of symmetry A". The dimensions for this embodiment may conveniently be generally the same as in the preceding embodiments 10 and 110, and the structure of the base portion 212 is similar to that of th construction of the base portions 12 and 112. That is, the base portion 212 is constructed of two substantially parallel surfaces, a first axially extending surface 216 and a second axially extending surface 218. The first axially extending surface 216 has a first axial edge 220 and a second axial edge 222, and the second axial extending surface 218 has a first axial edge 224 and a second axial edge 226. The second axial edges 222 and 226 are joined by a radially extending surface 228.

An annular head portion 214 is formed integrally with the base portion 212, being joined between the first axial edges 220 and 224 of their respective axial surfaces 216 and 218 of the base portion 212. The head portion 214 has two planar surfaces, a first planar surface 230 extending radially outwardly a predetermined distance from the first axial edge 224 of the second axial surface 218, defining a radially outward edge 232, and a second planar surface 248 extending radially inwardly a predetermined distance from the first axial edge 220 of the first axial surface 216, defining a radially inward edge 236. The head portion 214 has a maximum axial thickness B", which thickness is determined by the curvature of the arcuate surface 234, generally as described with respect to the embodiment of FIGS. 1 and 2. The arcuate surface 234 has a radially inward edge 236 and a radially outward edge 238. The radially inward edge 236 of the arcuate surface 234 is joined to the radially inward axial edge 250 of the radially inward planar surface 248 of the head portion 214, while the outer edge 238 of the arcuate surface 234 is joined to the radially outward axial edge 232 of the radially outward planar surface 230 of the head portion 214. As in the preceding embodiments the dimensions of this embodiment 210 may conveniently be generally the same and may be modified for the same reasons.

Now that the structure of the sealing ring has been described a particular mode of use is disclosed in the fragmentary views of FIGS. 7 through 12. These figures are but illustrative fragmentary views of complete installations, which may suitably be pipe flanges or other portions of a larger machine, which is not shown. In FIG. 7 the sealing ring 10 is illustrated installed between a first member 52 and a second member 54, both of which members may conveniently be pipe flanges or similar structures. The first member 52 has an opposing face 56, and the second member 54 has an opposing face 58 and a recess 60 in that opposing face 58. A means for securing first member 52 and second member 54 is conveniently represented by threaded bolt 62, which is passed through aperture 64 in first member 52 and threadably engaged with threaded aperture 66 in second member 54. By tightening the bolt 62, the first member 52 and second member 54 are brought together. Bolt 62 is but one of a number of bolts used to tighten first member 52 and second member 54 together; however, the others are not shown.

As can be seen in FIG. 7 the dimensions of the annular base portion 12 are sized to fit snugly, generally without leaving gaps, into recess 60 having a generally rectangular cross section. It can be seen that the outward planar surface 30 forms a shoulder 68 which engages the facing surface 58 of second member 54.

FIG. 7 illustrates the installation of the sealing ring 10 in the noncompressed state. FIG. 8 illustrates the sealing ring 10 after the first member 52 and the second member 54 have been brought tightly together by tightening the bolts illustrated by bolt 62. In this state the annular head portion 14 has been compressed, sealing tightly to the first member 52 with the shoulder 68 sealing against opposing face 58 of second member 54. The annular base portion 12 is compressed only slightly into the recess 60.

FIGS. 9 and 10 illustrate the installation of sealing ring 110 between first member 52 and second member 54. In this case shoulder 68 engages the other side of the edge of the recess 60. At times, due to the structural design of the equipment in which the sealing ring 110 is installed, the recess 60 is located proximal the aperture 70. One of the purposes for placing the shoulder 168 on the outward side of sealing ring 110 is to move the shoulder 168 of head portion 114 further away from the aperture 70 that passes through second member 54. FIG. 10, as in FIG. 8, illustrates the compression of the sealing ring, in this case sealing ring 110.

FIGS. 11 and 12 illustrate the installation of sealing ring 210 between first member 52 and second member 54. Sealing ring 210 has two shoulders 68 and 168 which engage the opposing face 58 of second member 54 adjacent both sides of recess 60. FIG. 12 illustrates the compression of the annular head portion 214 when first member 52 and second member 54 are pressed together by the sealing means 62. By virtue of the greater size of head portion 214 and by having two shoulders 68 and 168, the sealing ring 210 may be able to withstand greater positive and negative pressures than rings configured as in FIGS. 1 through 4.

While the foregoing has described three preferred embodiments of the sealing ring and sealing ring system, it is to be understood that this description is illustrative only of the principles of the invention and is not to be considered limitative thereof. Because numerous modifications and variations of the disclosed apparatus, all within the scope of the invention, will readily occur to those skilled in the art, the scope of this invention is to be limited solely by the claims appended hereto.

What is claimed is:

1. A sealing ring system in which two members are secured together with a sealing ring having a predetermined axis of symmetry and formed of a resiliently compressible elastomer interposed therebetween, comprising:

two members, having mutually opposing and generally planar faces, one member having an annular recess in said opposing face;

means for securing said members together; and a generally circular resiliently compressible elastomeric sealing ring comprising;

an axisymmetric annular base portion having a predetermined axis of symmetry generally normal to the plane of said circle, said base portion having substantially parallel and continuous first and second axially extending surfaces extending generally concentric to said axis, each said surface having a first axial edge and a second axial edge spaced therefrom, with said second axial edges joined together by a continuous radially extending surface, said base portion being received by and engaging said recess of said one member;

an annular head portion formed integrally with said base portion and extending between both of said first axial edges of said axially extending surfaces of said base portion, said head portion having a predetermined maximum axial thickness and at least one substantially planar surface extending generally radially a predetermined distance from said first axial edge of at least one of said axially extending surfaces of said base, such that, when said base portion is received by said annular recess, said radially extending planar surface forms a shoulder with said one of said axially extending surface of said base, and said planar surface engaging said face of said member adjacent said annular recess, such that when said securing means forces said opposing faces adjacent one another, said head portion is sealingly compressed between said opposed members.

2. A sealing ring system as in claim 1 wherein one said planar surface of said head portion extends radially inwardly a predetermined distance from said first axial edge of said first axially extending surface of said base portion to define a radially inward edge of said one planar surface.

3. A sealing ring system as in claim 1 wherein one said planar surface of said head portion extends radially outwardly a predetermined distance from said first axial edge of said second axially extending surface of said base portion to define a radially outward edge of said one planar surface.

4. A sealing ring system as in claim 1 wherein said head portion includes two said planar surfaces, with one said planar surface extending radially inwardly a predetermined distance from said first axial edge of said first axially extending surface of said base portion to define a radially inward edge of said one planar surface and the other said planar surface extending radially outwardly a predetermined distance from said first axial edge of said second axially extending surface of said base portion to define a radially outward edge of said other planar surface.

5. A sealing ring system as in claim 1 wherein said base of said sealing ring has a radial cross-section of substantially the same configuration as a radial cross-section of said annular recess.

6. A sealing ring system as in claim 2 wherein said head portion includes one part extending axially away from said base portion and defining an arcuate surface having a radially inward edge and a radially outward edge, said radially inward edge of said arcuate surface being joined to and coterminous with said radially inward edge of said radially inwardly extending planar surface and said radially outward edge of said arcuate surface being joined to and coterminous with said first axial edge of said second axially extending surface of said base portion.

7. A sealing ring system as in claim 3 wherein said head portion includes one part extending axially away from said base portion and defining an arcuate surface having a radially inward edge and a radially outward edge, said radially outward edge of said arcuate surface being joined to said radially outward edge of said radially outwardly extending planar surface and said radially inward edge of said arcuate surface being joined to said first axial edge of said first axially extending surface of said base portion.

8. A sealing ring system as in claim 4 wherein said head portion includes one part extending axially away from said base portion and defining an arcuate surface having a radially inward edge and a radially outward edge, said radially inward edge of said arcuate surface being joined to said radially inward edge of said one planar surface and said radially outward edge of said arcuate surface being joined to said radially outward edge of said other planar surface.

9. A sealing ring having a predetermined axis of symmetry and formed of a resiliently compressible elastomer, for use in a sealing ring system in which two members are secured together with the ring interposed therebetween, comprising an annular base portion having substantially parallel and continuous first and second axially extending surfaces, each said surface having a first axial edge and a second axial edge spaced therefrom, with said second axial edges being joined to one another by a radially extending surface; and an annular head portion, formed integrally with said base portion and extending between both said first axial edges of said axially extending surfaces of said base portion, said head portion having a predetermined maximum axial thickness, at least one generally planar surface extending radially inwardly a predetermined distance from said first axial edge of said first axially extending surface of said base portion to define a radially inward edge of said one planar surface, and one part extending axially away from said base portion and defining an arcuate surface having a radially inward edge and a radially outward edge, said radially inward edge of said arcuate surface being joined to and coterminous with said radially inward edge of said radially inwardly extending planar surface and said radially outward edge of said arcuate surface being joined to and coterminous with said first axial edge of said second axially extending surface of said base portion, whereby the planar surface and the adjacent axially extending surface form a shoulder.

10. A sealing ring having a predetermined axis of symmetry and formed of a resiliently compressible elastomer, for use in a sealing ring system in which two members are secured together with the ring interposed therebetween, comprising an annular base portion having substantially parallel and continuous first and second axially extending surfaces, each said surface having a first axial edge and a second axial edge spaced therefrom, with said second axial edges being joined to one another by a radially extending surface; and an annular head portion, formed integrally with said base portion and extending between both said first axial edges of said axially extending surfaces of said base portion, said head portion having a predetermined maximum axial thickness, two planar surfaces with one said planar surface extending radially inwardly a predetermined distance from said first axial edge of said first axially extending surface of said base portion to define a radially inward edge of said one planar surface, and the other said planar surface extending radially outwardly a predetermined distance from said first axial edge of said second axially extending surface of said base portion to define a radially outward edge of said other planar surface, and one part extending axially away from said base portion and defining an arcuate surface having a radially inward edge and a radially outward edge, said radially inward edge of said arcuate surface being joined to and coterminous with said radially inward edge of said radially one planar surface and said radially outward edge of said arcuate surface being joined to and coterminous with said radially outward edge of said other planar surface.

* * * * *